United States Patent  
Alvarez

(10) Patent No.: US 11,607,986 B2
(45) Date of Patent: Mar. 21, 2023

(54) HEADLIGHT OXIDATION PROTECTOR HAVING TWO SHEETS AND FLAP FOR FITTING UNDER HOOD OF VEHICLE

(71) Applicant: Luis Alvarez, Las Vegas, NV (US)

(72) Inventor: Luis Alvarez, Las Vegas, NV (US)

(*) Notice: Subject to any disclaimer, the term of this patent is extended or adjusted under 35 U.S.C. 154(b) by 0 days.

(21) Appl. No.: 17/463,041

(22) Filed: Aug. 31, 2021

(65) Prior Publication Data

US 2022/0063479 A1 Mar. 3, 2022

Related U.S. Application Data

(60) Provisional application No. 63/073,817, filed on Sep. 2, 2020.

(51) Int. Cl.
*B60Q 1/00* (2006.01)
*B60Q 1/04* (2006.01)
(52) U.S. Cl.
CPC ............. *B60Q 1/0005* (2013.01); *B60Q 1/04* (2013.01)

(58) Field of Classification Search
CPC .............................. B60J 11/06; B60Q 1/0005
See application file for complete search history.

(56) References Cited

U.S. PATENT DOCUMENTS 4,049,036 A 9/1977 Gebhardt
2015/0183365 A1* 7/2015 Aboughanem .......... B60J 11/06
362/520

* cited by examiner

*Primary Examiner* — Robert J May
(74) *Attorney, Agent, or Firm* — Chernoff, Vilhauer, McClung & Stenzel, LLP

(57) ABSTRACT

A vehicle proctor includes a first sheet sized to cover a pair of headlights of the vehicle. A second sheet sized to be within 80% of the same surface area as the first sheet arranged in an opposing relationship. The first sheet and the second sheets are joined around their periphery. The first sheet has a heavier material than the second sheet. A flap is interconnected with the first sheet. The flap fits under the hood of the vehicle. The flap has an interior deformable material and has a thickness greater than the combination of the first and second sheets.

4 Claims, 26 Drawing Sheets

HEADLIGHT OXIDATION PROTECTOR HAVING TWO SHEETS AND FLAP FOR FITTING UNDER HOOD OF VEHICLE

CROSS-REFERENCE TO RELATED APPLICATIONS

This application claims the benefit of U.S. Provisional Patent Application No. 63/073,817 filed Sep. 2, 2020.

FIELD OF THE INVENTION

The present invention relates to sun protectors for vehicles.

BACKGROUND OF THE INVENTION

A number of vehicle covers have been developed in recent years for various purposes. Most of these covers are designed to simply protect a vehicle's exterior, i.e., painted surfaces, vinyl roof, etc., from the elements.

A few covers, however, have been designed to not only protect a vehicle's exterior but to also reduce the buildup of heat in the vehicle's interior. High heat is not only, quite obviously, uncomfortable for people just getting into the vehicle on a hot day but it can also cause damage to the vehicle's interior, particularly the vinyl covered surfaces of the vehicle such as the dashboard. Heat can also cause damage to items left in the vehicle.

A few vehicle covers have also been specifically developed for use during the winter. These covers ostensibly make it easy to remove snow and ice covering a vehicle. The snow and ice is removed by simply removing or pulling the cover off the vehicle. In actuality, the removal of such a cover is often not easy since the cover often freezes to the vehicle's surface when ambient temperatures drop below freezing. Such freezing is apparently caused by the buildup of condensation on the vehicle's surface under the cover. When freezing conditions occur, the condensation freezes causing the cover to freeze to the vehicle's surface. Such freezing can also occur if the vehicle is wet when the cover is placed on. The U.S. Pat. No. 4,049,036 to Gebhardt discloses a cover which is claimed to solve the aforementioned freezing problem. Gebhardt's cover includes a pair of sheets in opposed relationship which are adjoined at their ends to form a pocket. Resilient means are disposed in the pocket to provide a plurality of interstices. The interstices serve as insulating air pockets to prevent the inner surface of the cover from sticking to the adjacent window. The resilient means preferably includes a plurality of coil springs which prevent damage to the sheets when pulling the cover off the vehicle since the springs bear the load of accumulated snow and ice instead of the sheets.

However, no covers have been made that protect just a vehicle's headlights from sun damage. What is desired, therefore, is a cover is needed to prevent vehicle's headlights from becoming cloudy or otherwise sun, ice, or cold-weather damaged.

BRIEF SUMMARY OF THE INVENTION

In an embodiment, the protector is designed to cover the left and right front headlights of a vehicle while parked during the day to help reduce headlights getting oxidized. Oxidation makes headlights look foggy, cloudy, yellow and in some cases physically rough. Some embodiments of the protector are individually designed and manufactured to fit various makes, models, and years of vehicles.

In an embodiment, the protector can be made from marine-grade vinyl or full grain leather. Magnets, sand, or hard cylinder plastic, or felt can also be used. Embodiments of the protector, hereinafter referred to as the "shield" or "cover" are generally made up of three parts: a front, a backing, and a flap. Front: solid piece of material cut in the shape of vehicle's headlight. Backing: felt cloth sewn to act as the "backing" to protect the headlight from coming into contact with any harsh materials. Flap: near the top of the backside shield of shield, sewn on a protruding flap. This flap may extend, such as for example about three inches, and be filled with material, such as for example sand or a hard-plastic cylinder, that will help to "lock" the shield in place when the hood is closed and prevent thieves from readily pulling out and stealing the shield. Also, two magnets may be sewn into the flap to magnetize and "hold" the shield in place until the customer installs the other shield.

For installation, users release (or pop open) their car hood and place the shield over the headlights while sliding the weighted insert into the opening created when they released the hood. Once each shield has been installed, users simply close the hood.

For removal, users open the hood, slide the shield out, then close the hood. Shields can be stored when not in use in the accompanying pouch.

Manufacturing: each shield and backing are cut to shape using a design pattern according to the shape of the headlight of an automobile. A seamstress constructs and sews each shield together.

Some embodiments of the protector allow a user to customize the shield by placing logos on the outside of the shield. The logos can be from professional teams, colleges, movies, or the like. Users can also embroider or screen print a design onto the exterior of the shield.

A further understanding of various embodiments of the protector can be obtained by reference to embodiments set forth in the accompanying Description. Although the illustrated embodiments are merely exemplary of systems, apparatus, or methods for carrying out the present invention, both the organization and method of operation of the invention, in general, together with further objectives and advantages thereof, may be more easily understood by reference to the illustrations and the following Description. The Figures are not intended to limit the scope of this invention, but merely to clarify and exemplify the invention.

DETAILED DESCRIPTION OF THE INVENTION

Figure 1:
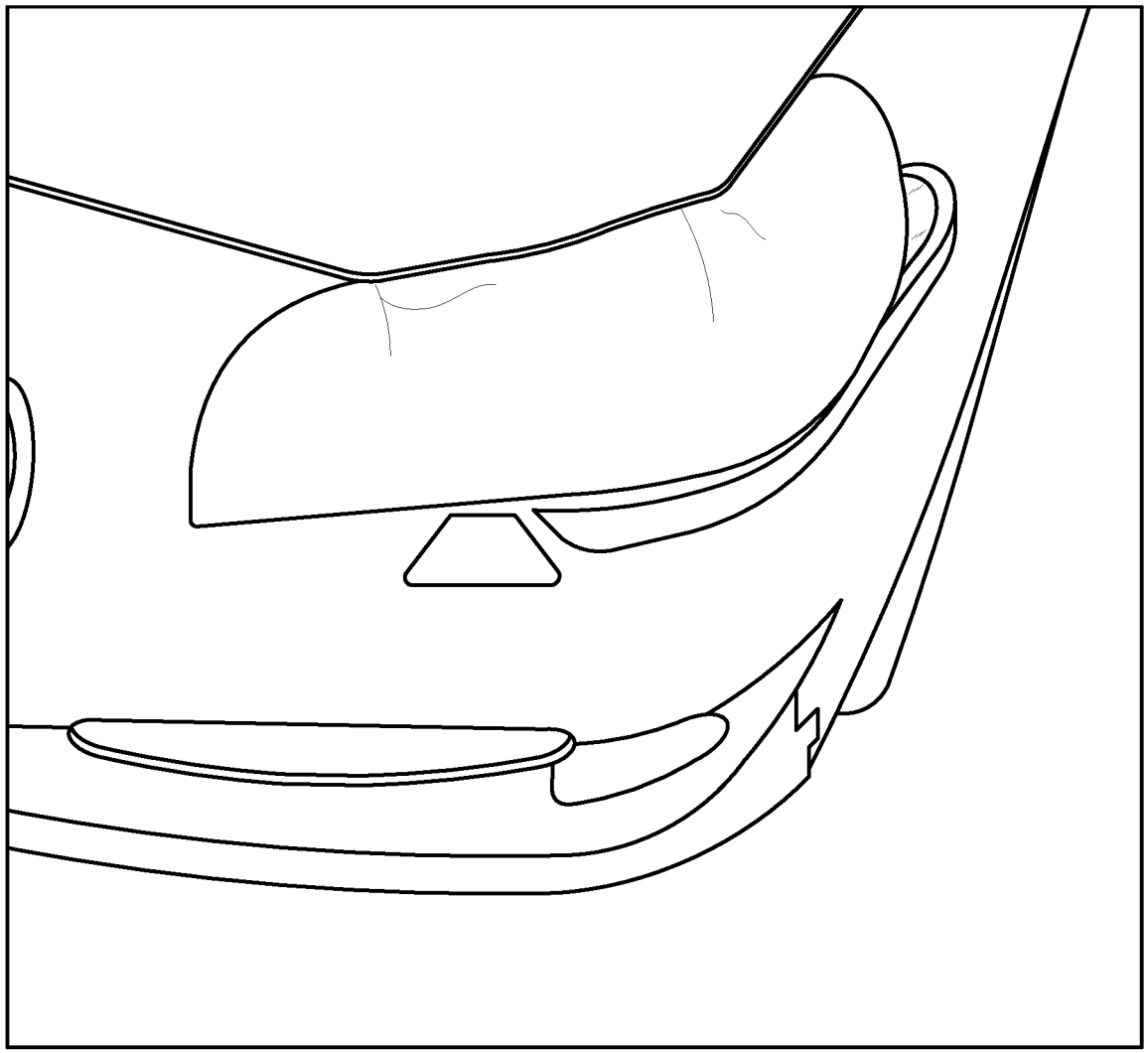
FIG. 1 is a drawing of a headlight oxidation cover installed over a headlight of a car as according to an embodiment of the present invention.
Figure 2:
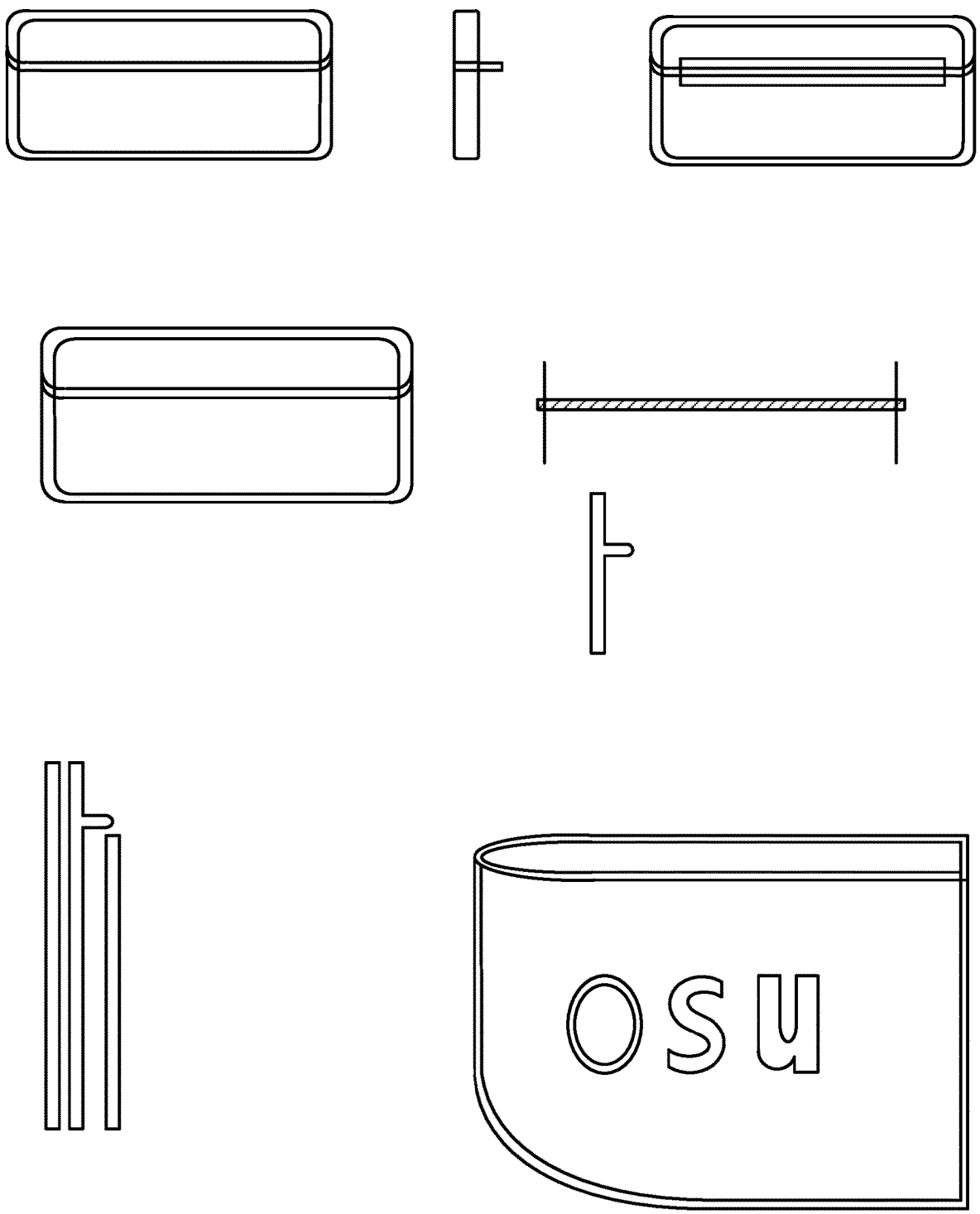
FIG. 2 are drawings of construction designs and ornamental features of a headlight oxidation protector as according to an embodiment of FIG. 1.
Figure 3:
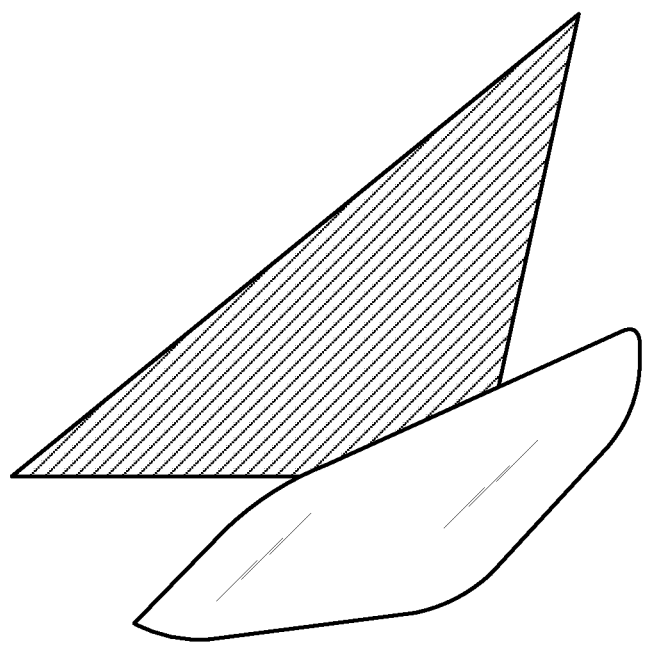
FIG. 3 are drawings of the installation of a headlight oxidation protector and the dimensions of said as according to an embodiment of FIG. 1.
Figure 4:
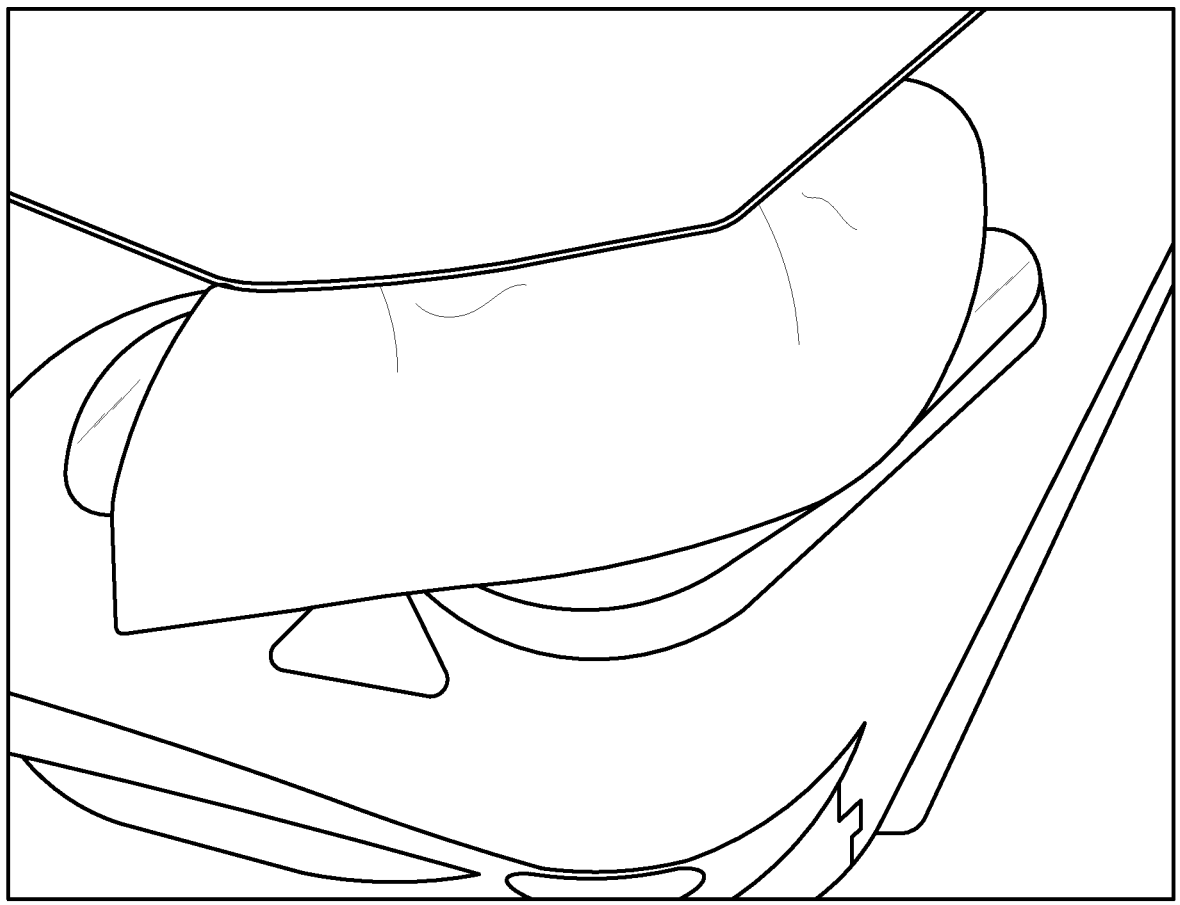
FIG. 4 is a closeup view of a headlight oxidation cover installed over a headlight of a car as according to an embodiment of FIG. 1.
Figure 5:
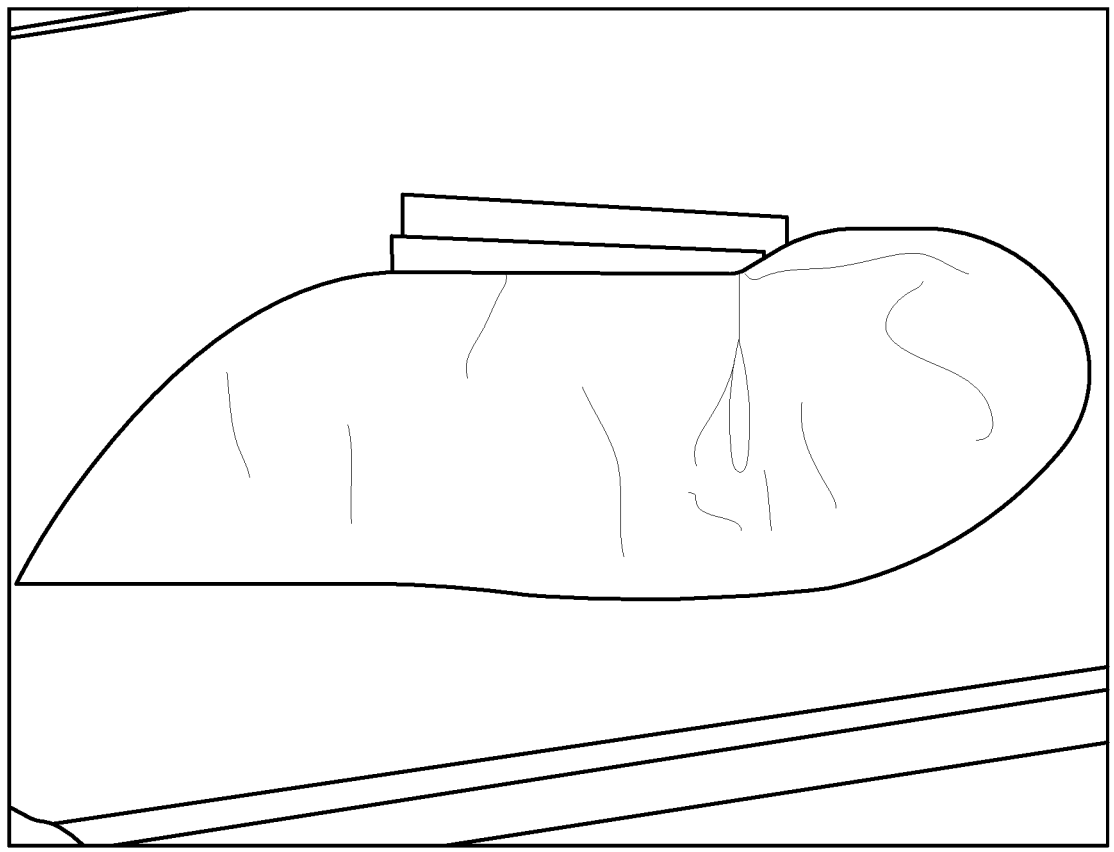
FIG. 5 is a drawing of the shape of a headlight oxidation cover when it is not installed over a headlight of a car as according to an embodiment of FIG. 1.
Figure 6:
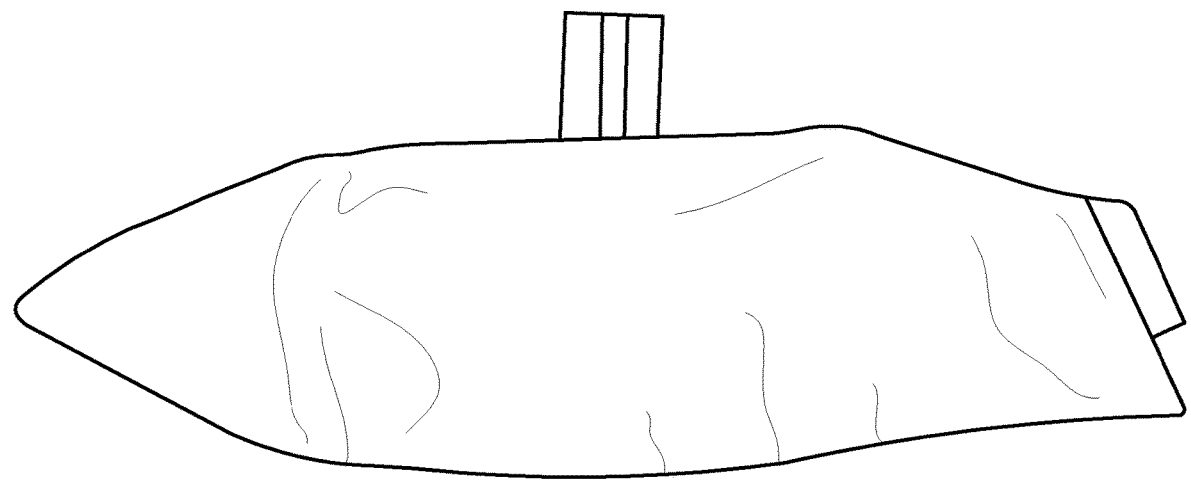
FIG. 6 is a drawing of an alternative embodiment of the headlight oxidation cover of the present disclosure.
Figure 7:
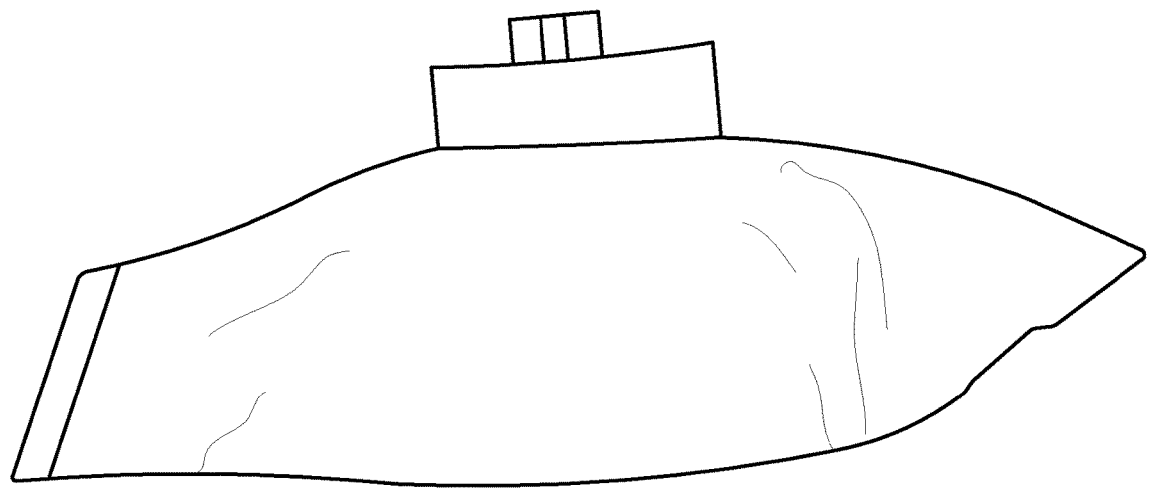
FIG. 7 is a drawing of the back of the embodiment of FIG. 6.
Figure 8:
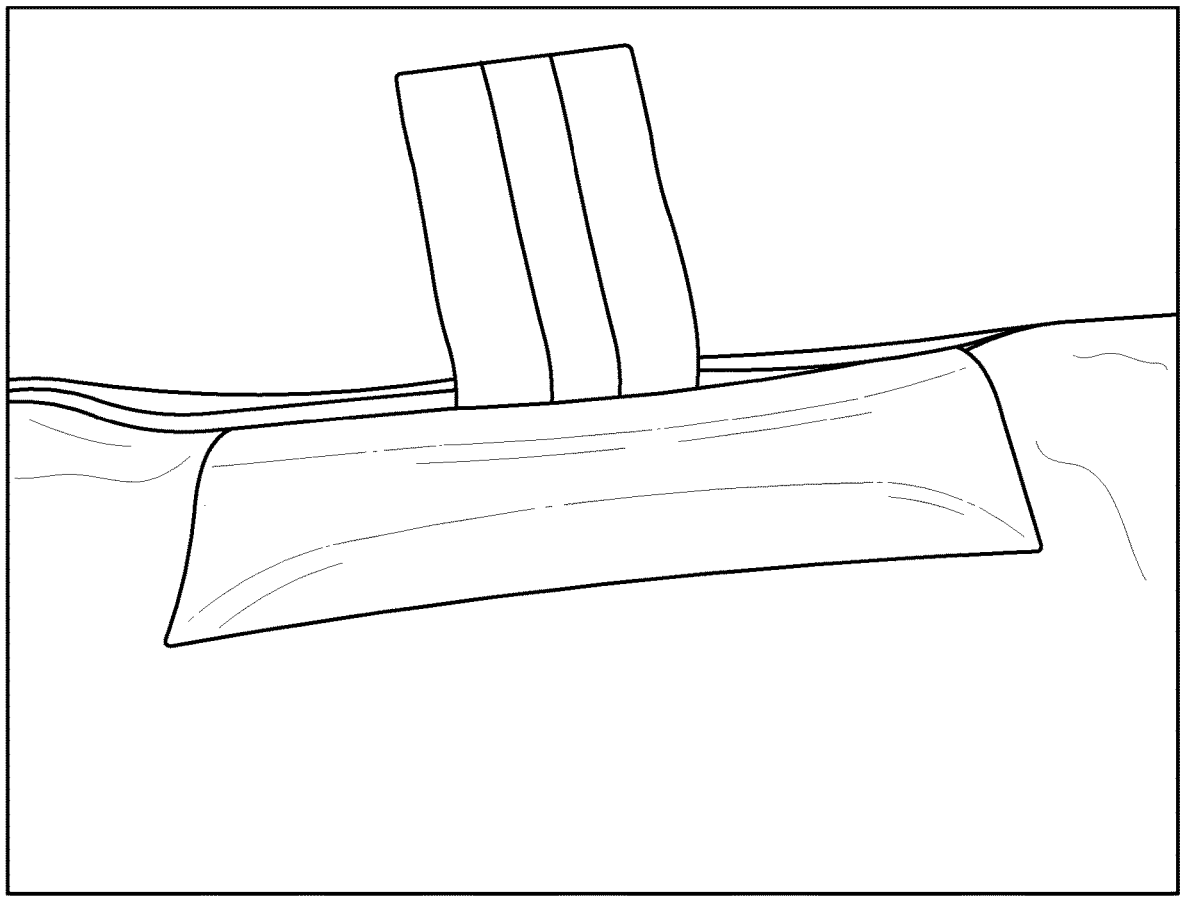
FIG. 8 is a drawing of a closeup of the embodiment of FIG. 6.
Figure 9:
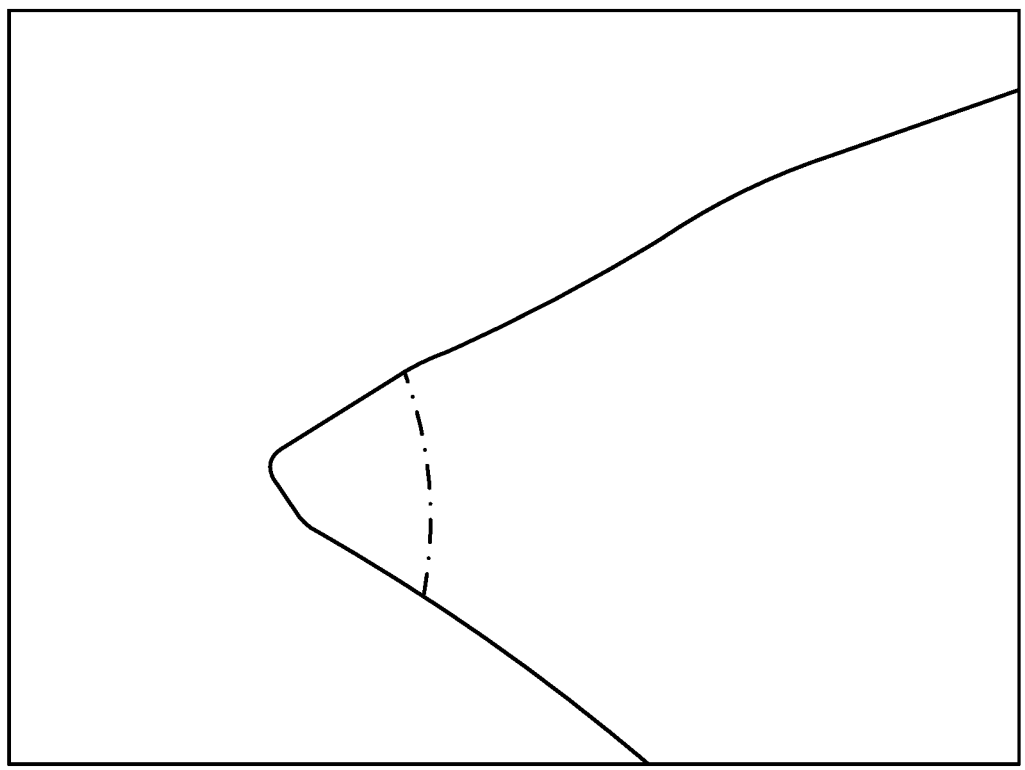
FIG. 9 is a drawing of a closeup of the embodiment of FIG. 6.
Figure 10:
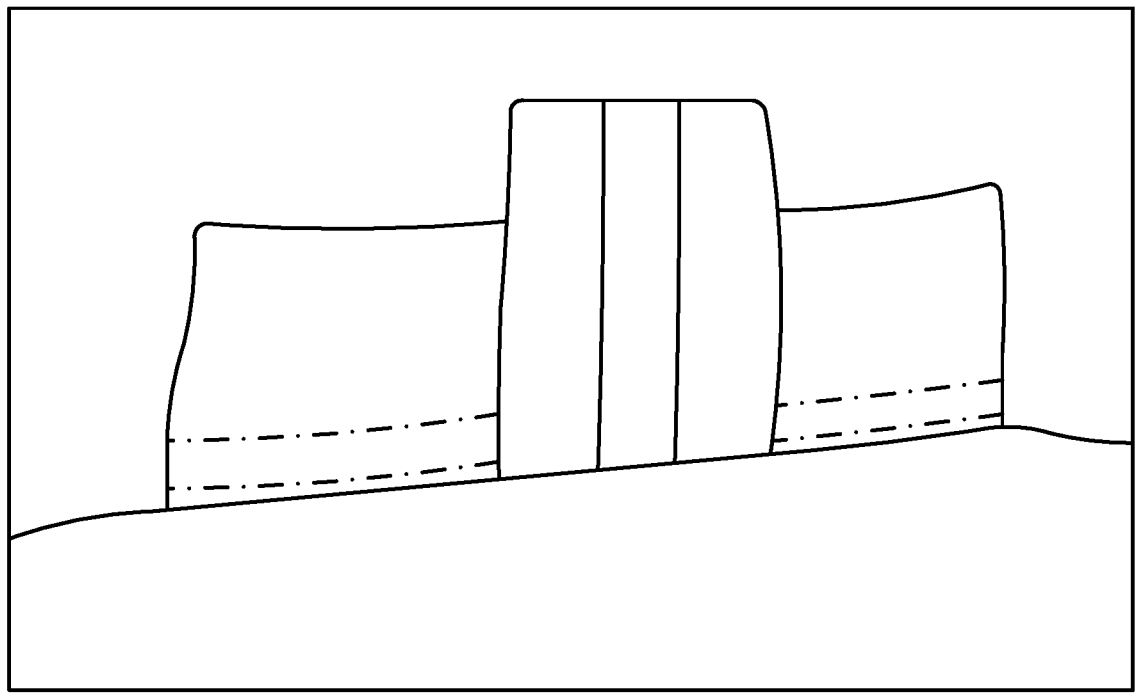
FIG. 10 is a drawing of a closeup of the embodiment of FIG. 6.
Figure 11:
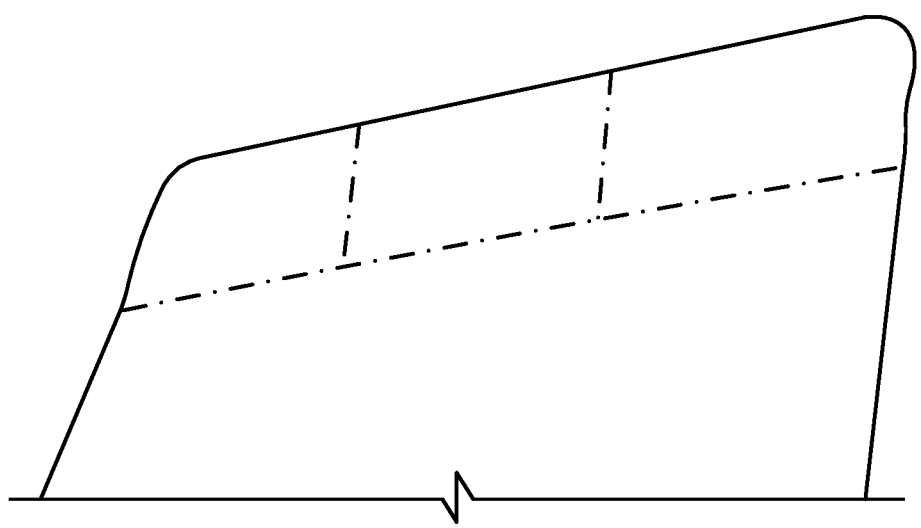
FIG. 11 is a drawing of a closeup of the embodiment of FIG. 6.
Figure 12:
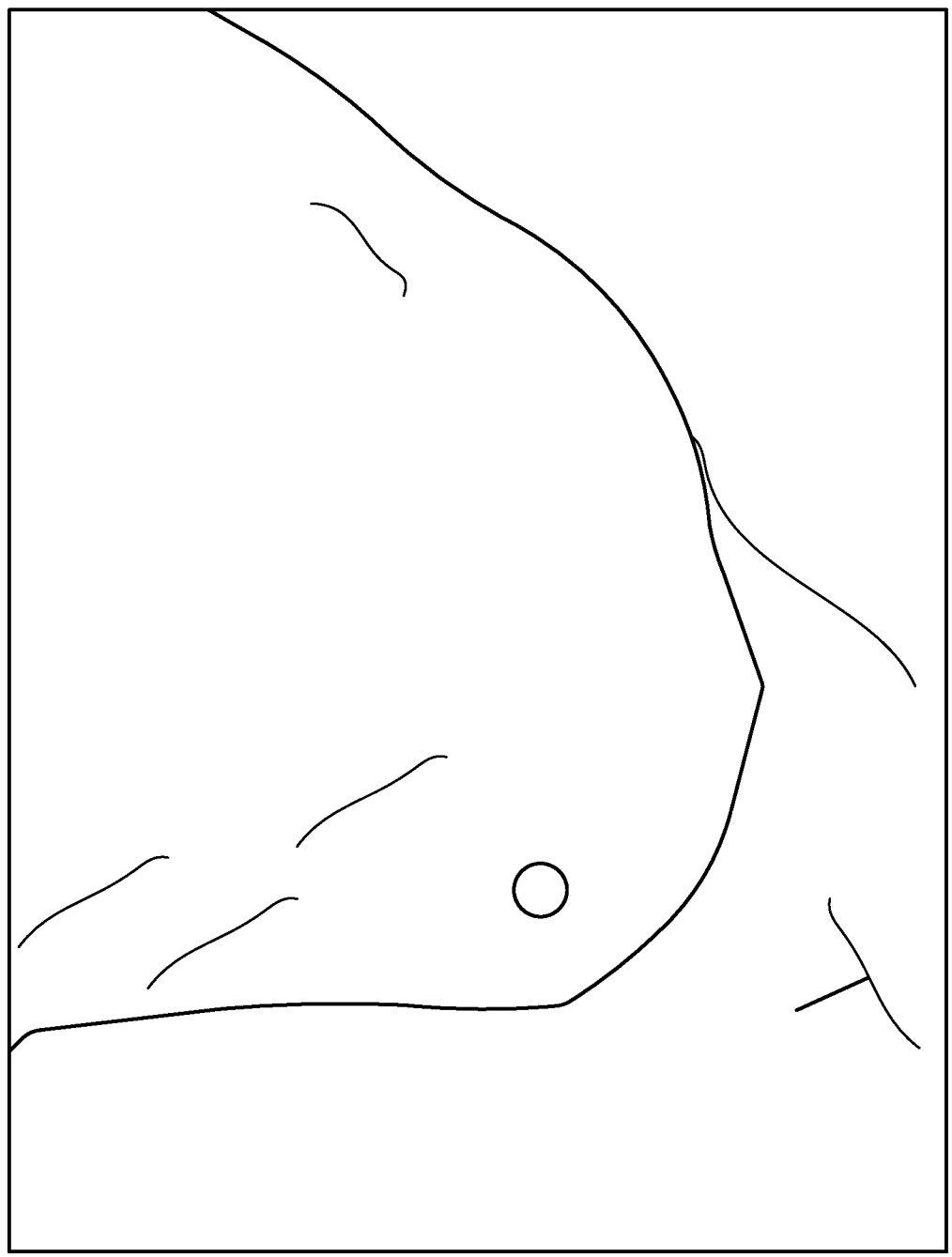
FIG. 12 is a drawing of an alternative embodiment of the headlight oxidation cover of the present disclosure.
Figure 13:
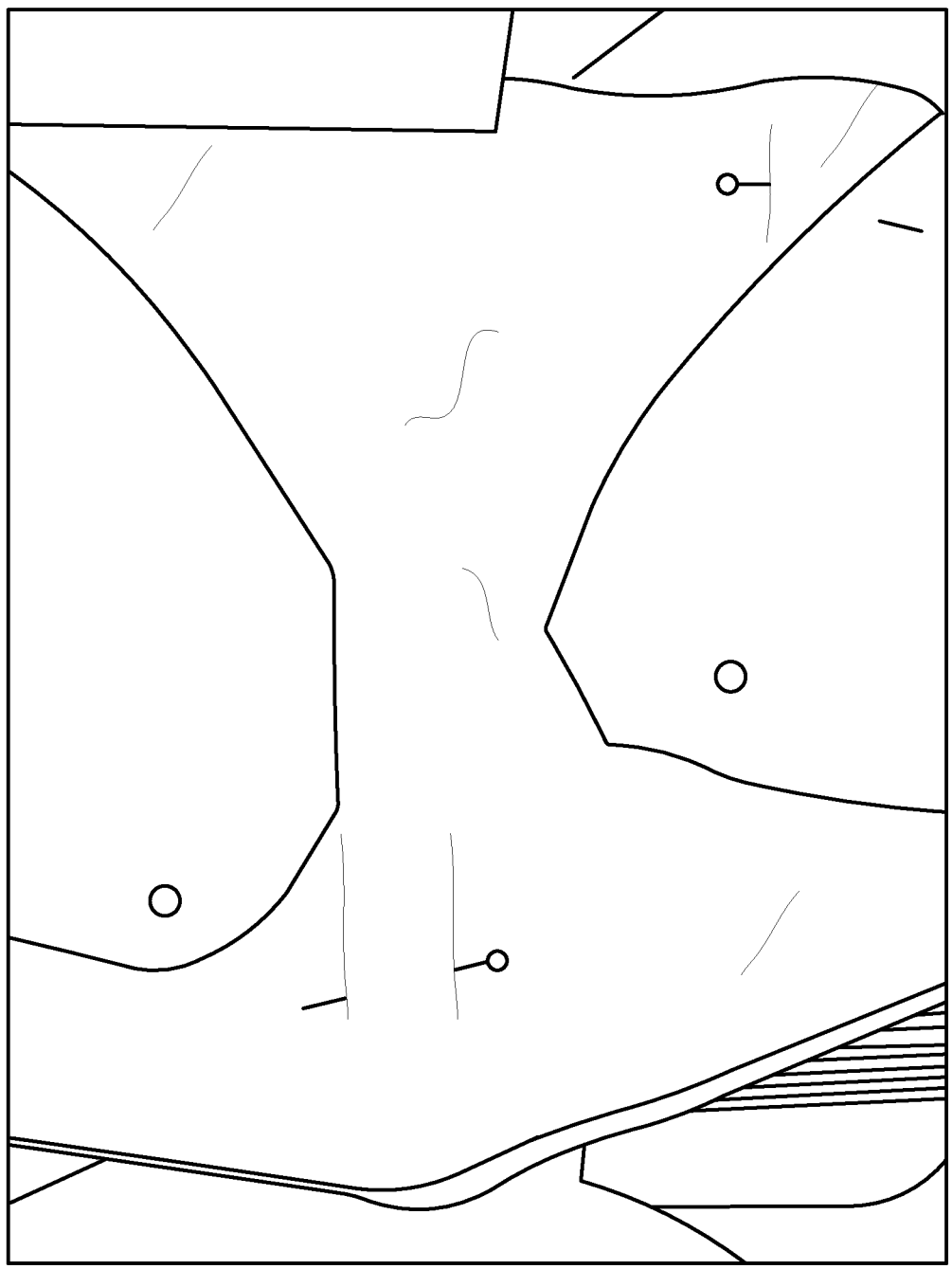
FIG. 13 is a drawing of the embodiment of FIG. 12.
Figure 14:
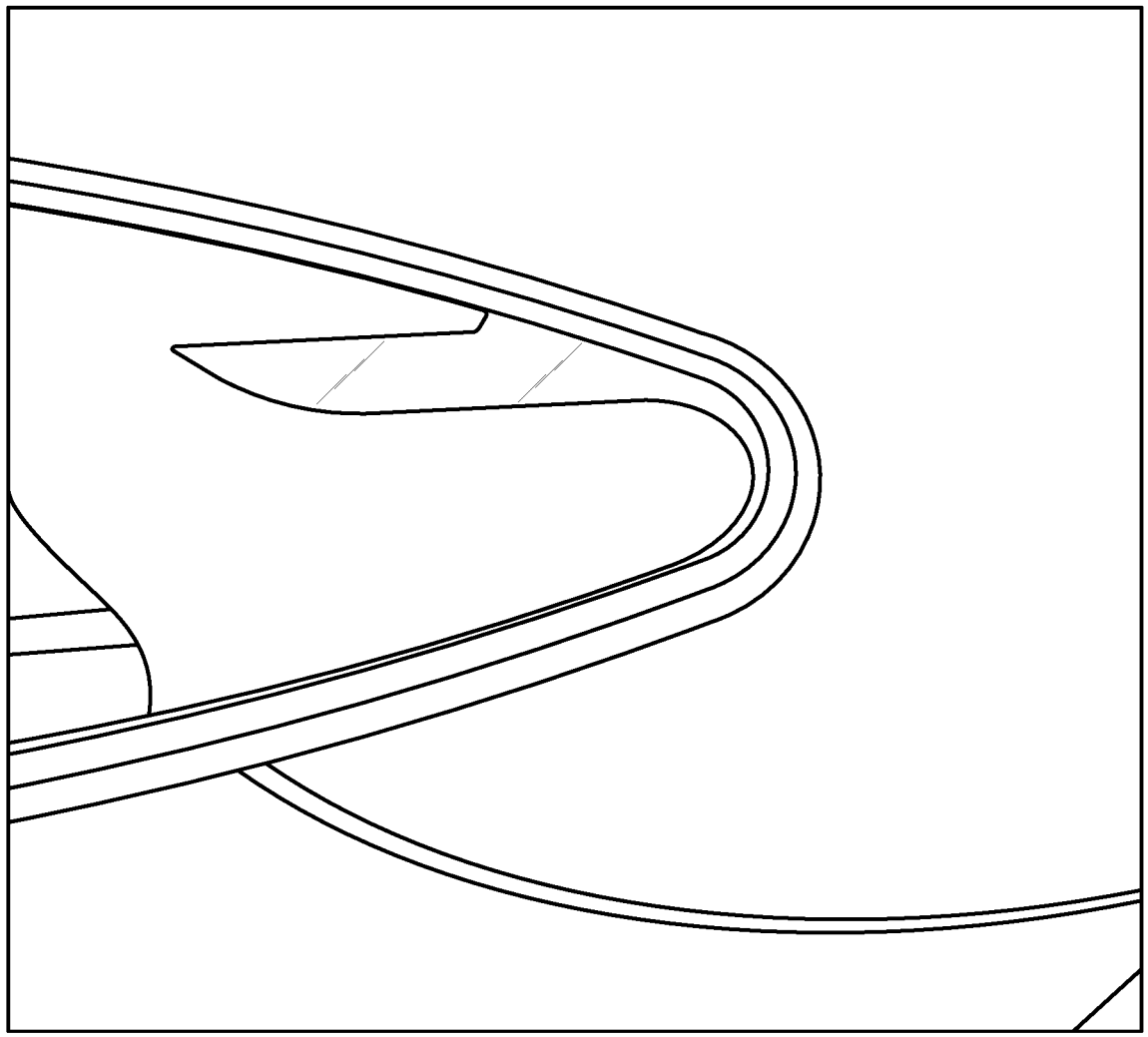
FIG. 14 is a drawing of the embodiment of FIG. 12.
Figure 15:
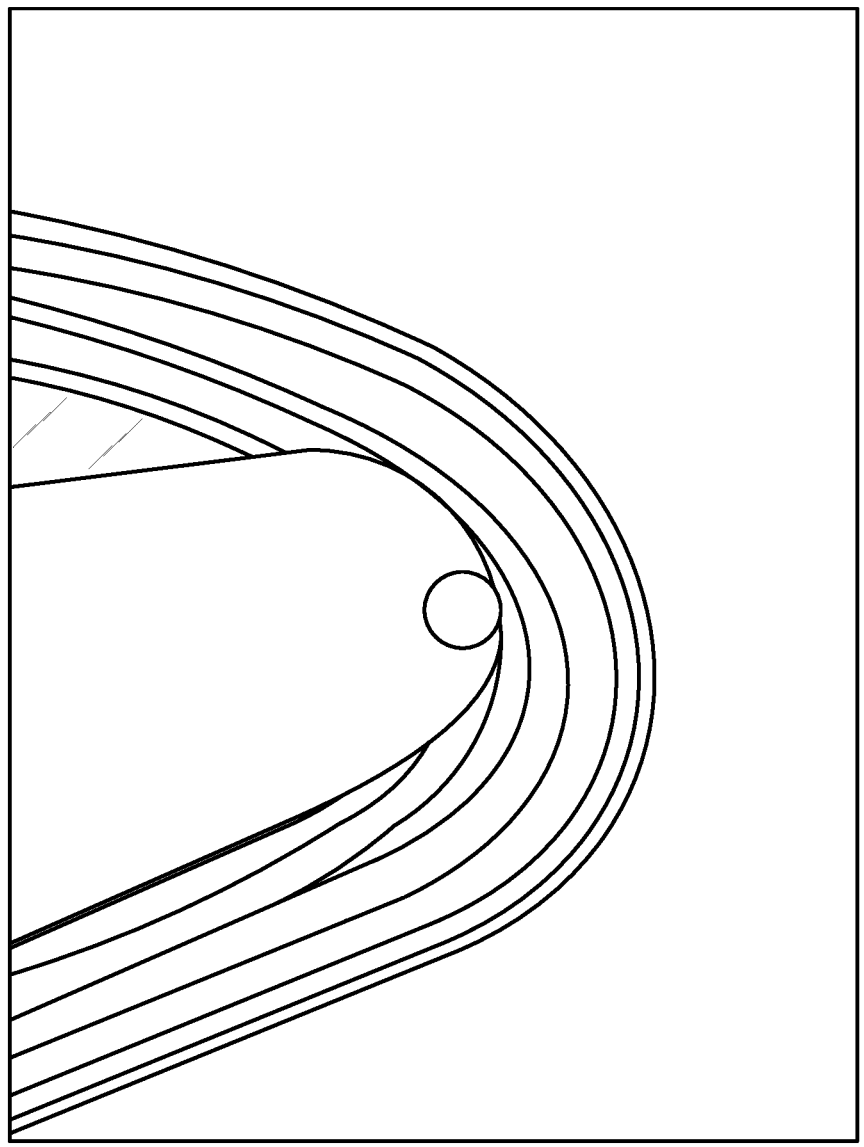
FIG. 15 is a drawing of the embodiment of FIG. 12.

In the following detailed Description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed Description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method, system, and apparatus include the discussed feature, advantage, or mode of operation. The following Description of the preferred embodiment is merely exemplary in nature and is in no way intended to limit the invention, its application, or use.

There has thus been broadly outlined the more important features of the invention in order that the detailed Description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods, and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

Turning now to the protector as shown in FIGS. 1-5, that will be discussed together, there is presented is an embodiment of a headlight oxidation protector. The term "shield" can be used herein interchangeably with the term "headlight oxidation protector" as referenced herein.

The shield comprises a front component that is constructed from an ultraviolet (UV) resistant material such as marine-grade vinyl full grain leather. The front is shaped to cover the headlight of a particular make, model, and year of automobile. Thus, every embodiment of the protector for different vehicles will have a slightly different overall shape and appearance. The front can also have logos affixed to them as per a user's choice. Alternatively, sayings, logos, designs, and/or shapes may be embroidered into the front, or anywhere on the protector.

The shield further comprises a backing component. The backing is shaped as a mirror-image of the front, or substantially a mirror-image (e.g., within 80% or more, within 90% or more, within 95% or more, of the same surface area, and is affixed to the backside of the front component. The backing may be constructed of a material such as felt, that does not damage or scratch the headlight lens when it comes in contact with the lens. The backing is the part of the protector that separates the heavier, rougher material of the front from contacting the headlight lens. The backing can be attached to the front by stitching, adhesion, heat bonding, or by any other method that securely mates the back and front together.

The third component of the shield is the flap. The flap extends from the top portion of the front and is preferably approximately three inches in width (e.g., 2 inches to 4 inches in width). The flap is designed and shaped to potentially fit under or into the hood of an automobile while the shield is covering the headlight. The flap has an enlarged section filled with a material such as, for example, sand or hard plastic that inhibits the flap from being pulled out from under the hood when the shield is in place. Other types of material used as the filling may include plastic beads, plastic pellets, wood dowels, glass beads, metal beads, gel beads, etc. In a preferred protector, the filling will be resistant to moisture and heat so as to prevent the filling from losing its integrity and shape over time. In some embodiments, the filling can be vacuumed sealed and placed inside the fabric and sewn or the filling can be poured into fabric and sewn shut. The flap helps secure the shield from inadvertently moving or slipping when in use. Additionally, in some embodiments, magnets of various shapes and numbers may be embedded within or sewn onto the flap to help hold the shield in place while the automobile's hood is open, such as when the user is installing shields over the headlights or removing the shields. The flap can be connected to the front by way of stitching, an adhesive, heat bonding, or another similar technique that securely attaches the components together.

To use the shield(s), a user opens the hood of his or her automobile. The user then places the appropriate shield over the left and right headlight of the car using the magnets in the flap to temporarily hold each shield in place while the hood is open. Once the shields are properly aligned over the headlights, the user closes the hood thereby locking the shields in place. When the user is ready to remove the shields, a reverse process is used. The user opens the hood of the automobile, then simply removes the left and right shield.

It should be noted that coverage of the headlight by the shield can be up to approximately 100% (e.g., 90 percent or more). Additional embodiments of the protector can cover slightly more than just the headlight alone, or slightly less if required for a particular embodiment.

As shown in FIGS. 6-11, another embodiment of a headlight oxidation protector may include a front component, backing component, a flap, and an additional tab. In some embodiments, the tab may be generally aligned with the flap and attached to same area where the flap is connected to the front and backing components. The tab may serve as a visual aid and frictional grip for the user to position the protector over the headlight. The tab may be constructed from materials that are weather-proof and heat-proof and may be in bright colors so that a user is able to see the protector at night.

As shown in FIGS. 12-15, similar to the embodiment shown in FIGS. 1-5, magnets may be sewn into the folds of the front and backing components of another embodiment of a headlight protector, and strategically placed on the headlights of the car, to help align the protector with the headlights properly. The number and the shapes of the magnets may vary, so long as the magnets are small enough in dimension to not interfere with the visibility of the headlights.

Figure 16:
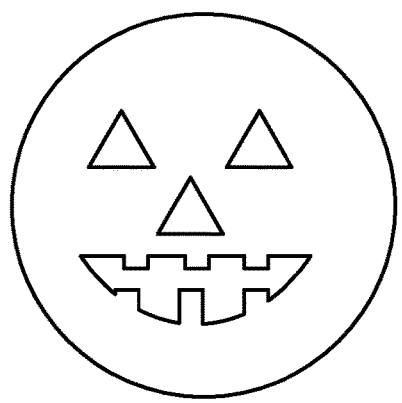
FIG. 16 are drawings of an alternative embodiment of the invention of the present disclosure.
Figure 16:
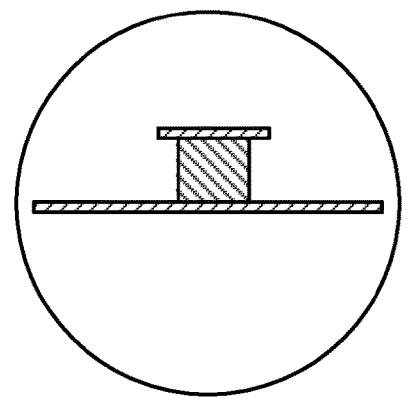
Figure 16:
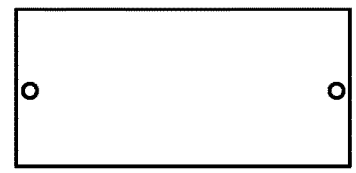
Figure 17:
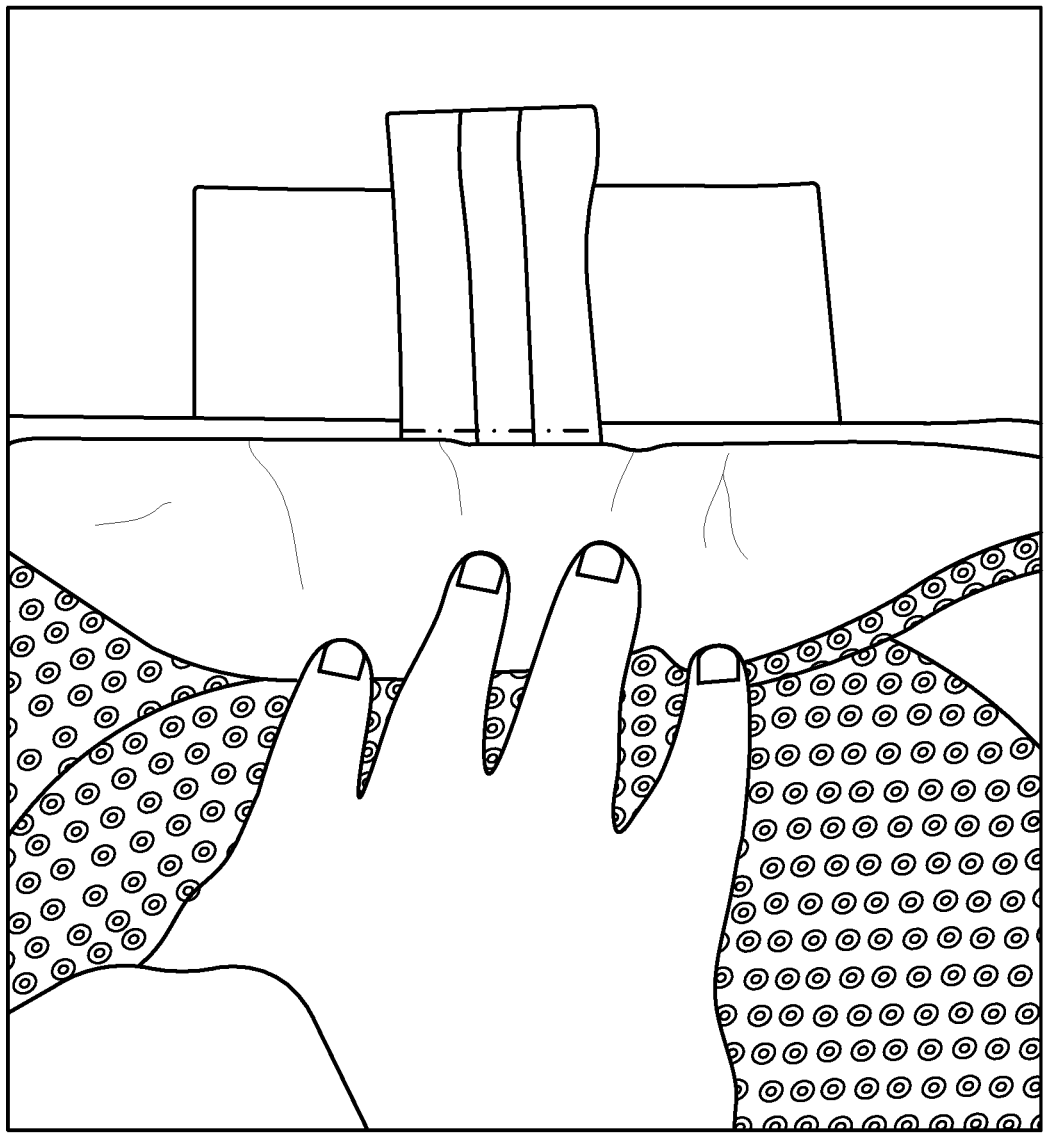
FIG. 17 is a drawing of an alternative embodiment of the headlight oxidation cover of the present disclosure.
Figure 18:
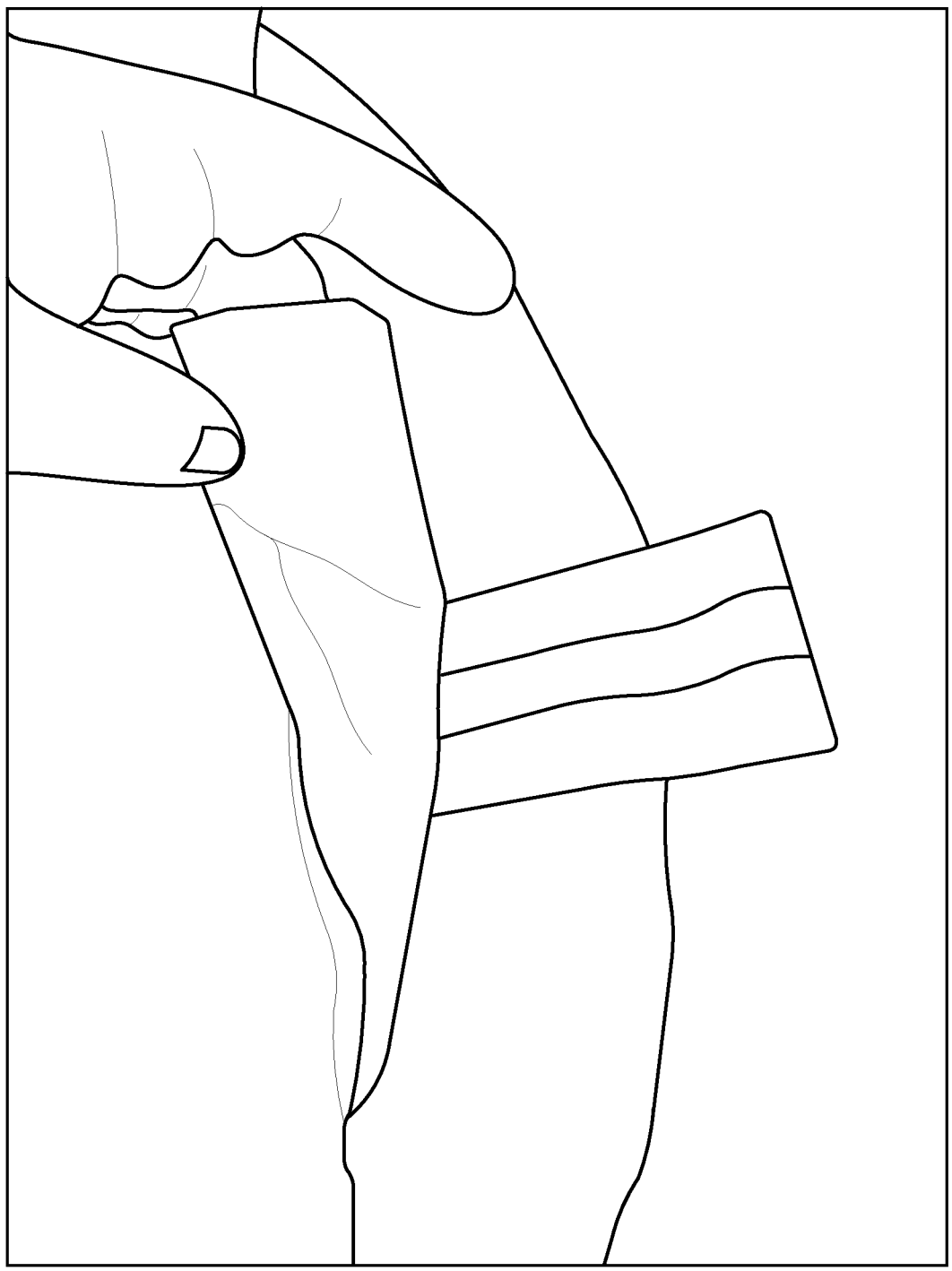
FIG. 18 is a drawing of the embodiment of FIG. 17.
Figure 19:
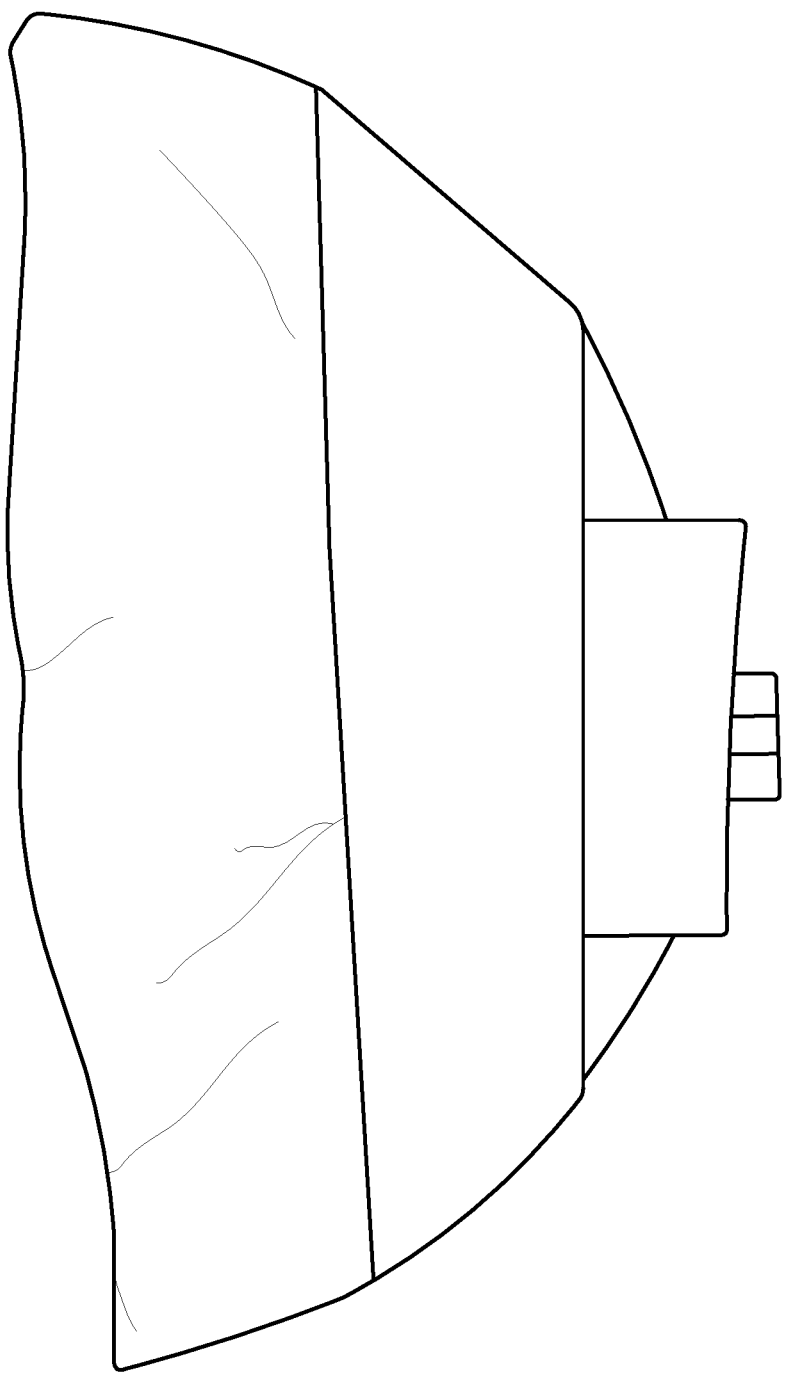
FIG. 19 is a drawing of the embodiment of FIG. 17.
Figure 20:
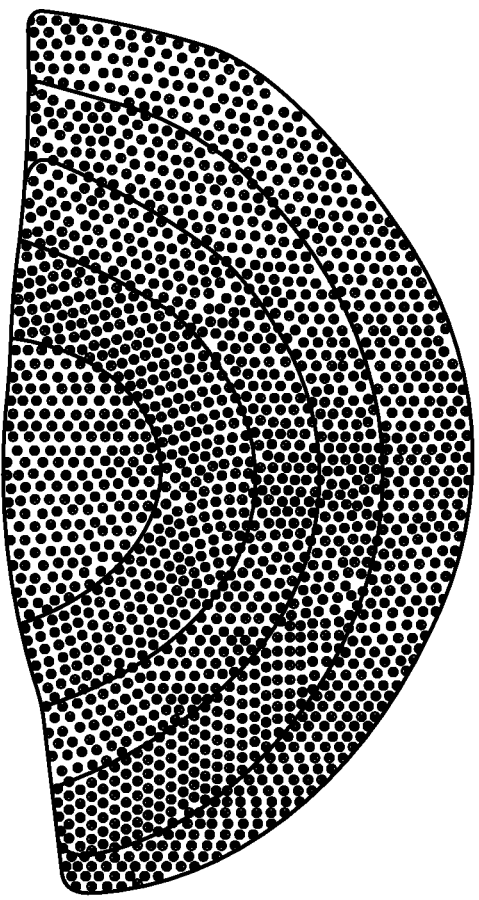
FIG. 20 is a drawing of the embodiment of FIG. 17.
Figure 21:
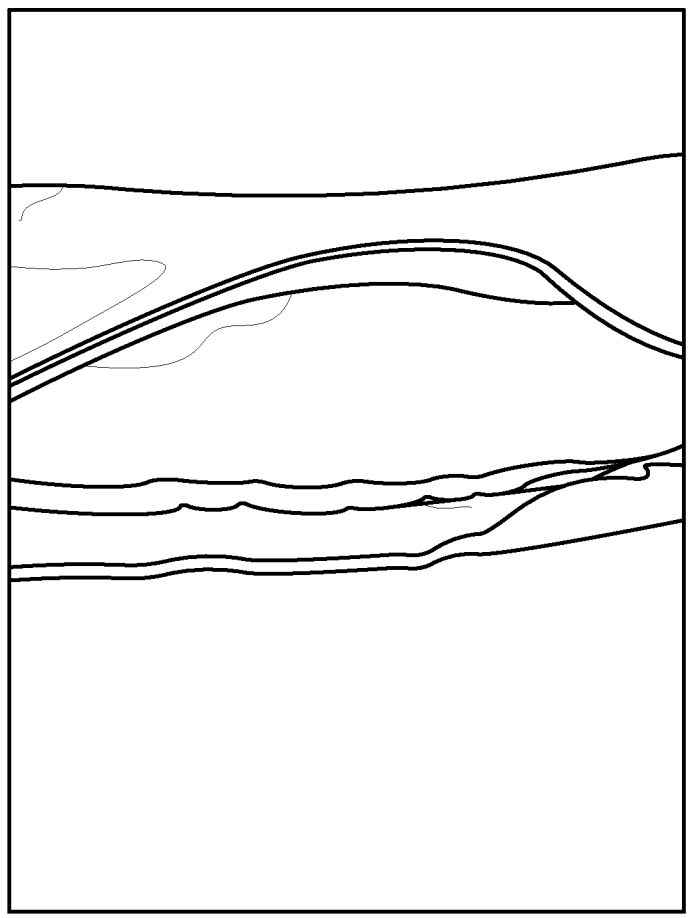
FIG. 21 is a drawing of the embodiment of FIG. 17.
Figure 22:
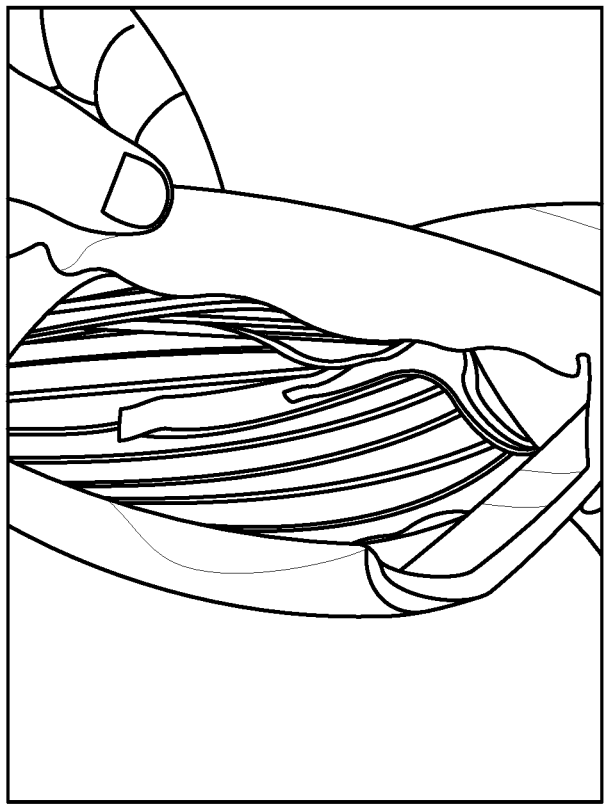
FIG. 22 is a drawing of the embodiment of FIG. 17.
Figure 23:
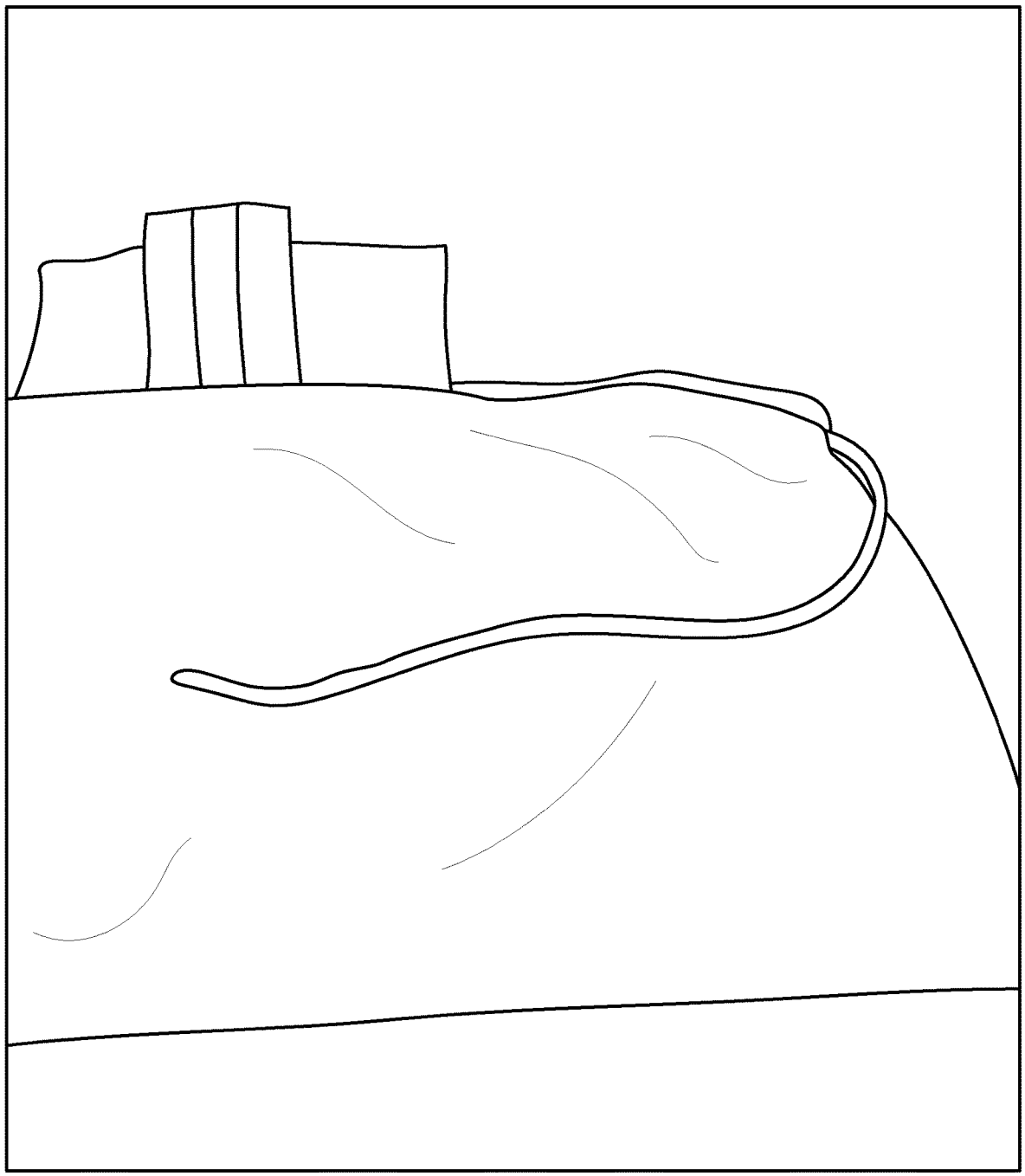
FIG. 23 is a drawing of the embodiment of FIG. 17.
Figure 24:
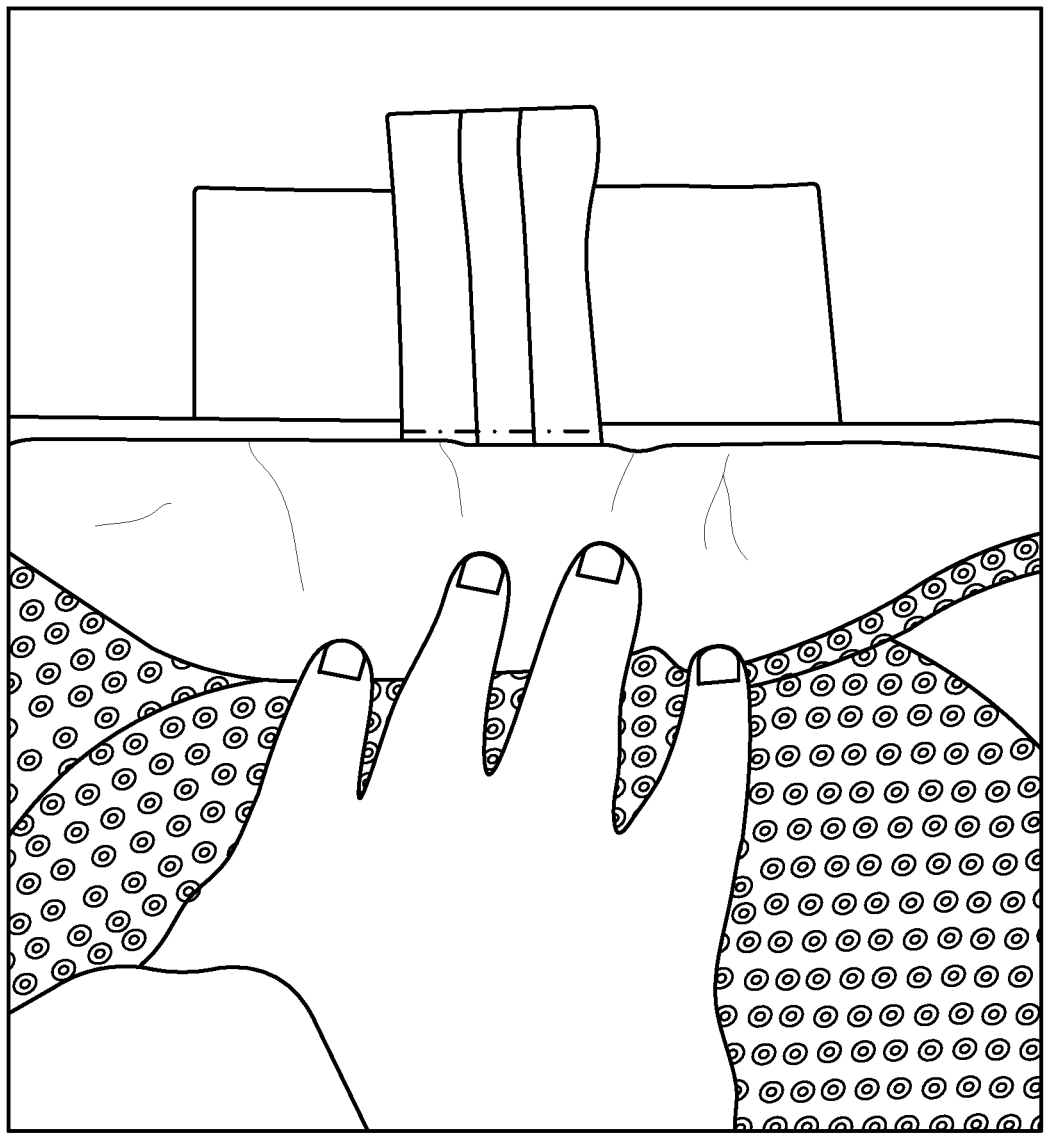
FIG. 24 is a drawing of an alternative embodiment of the headlight oxidation cover of the present disclosure.
Figure 25:
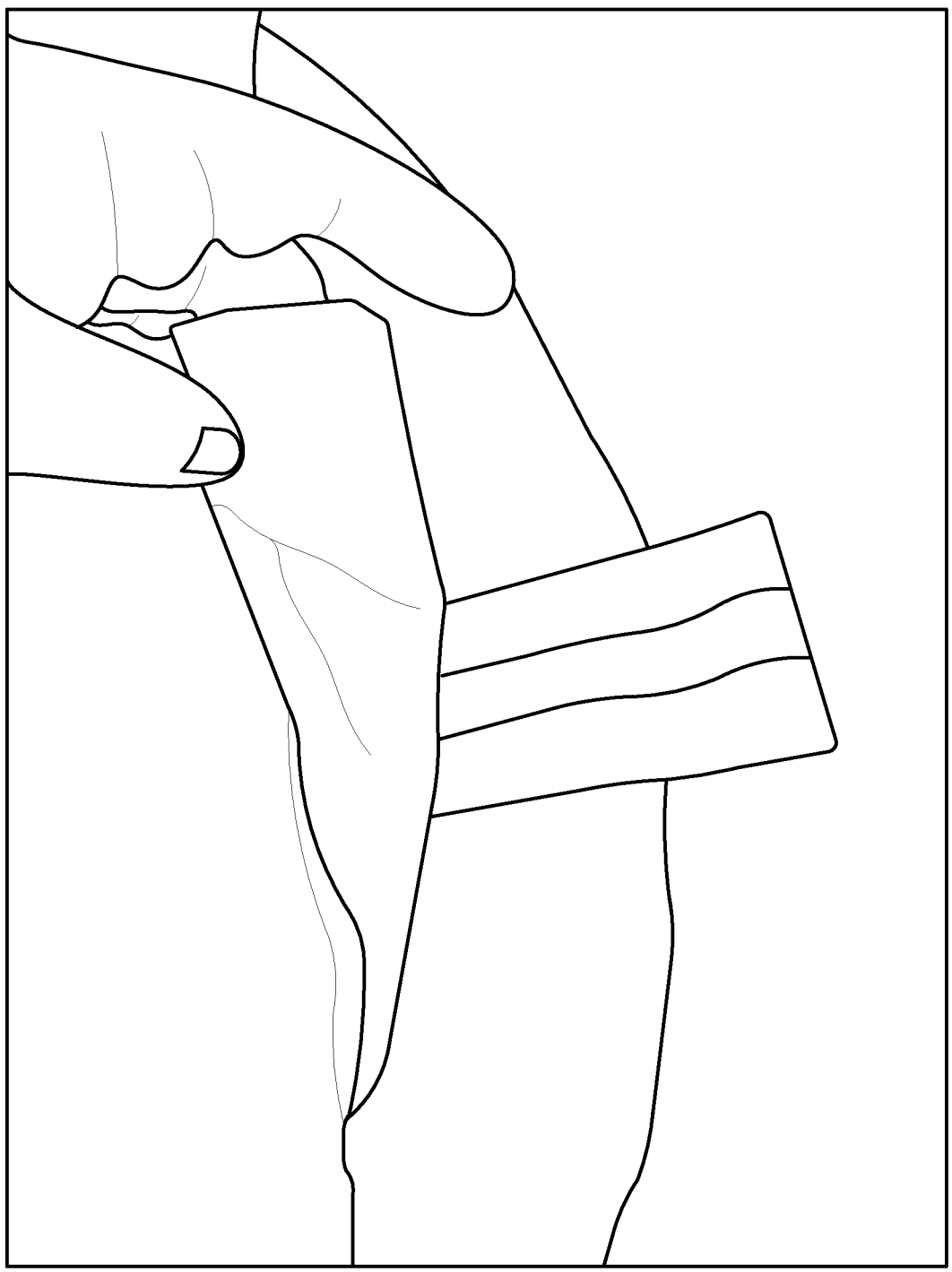
FIG. 25 is a drawing of the embodiment of FIG. 24.
Figure 26:
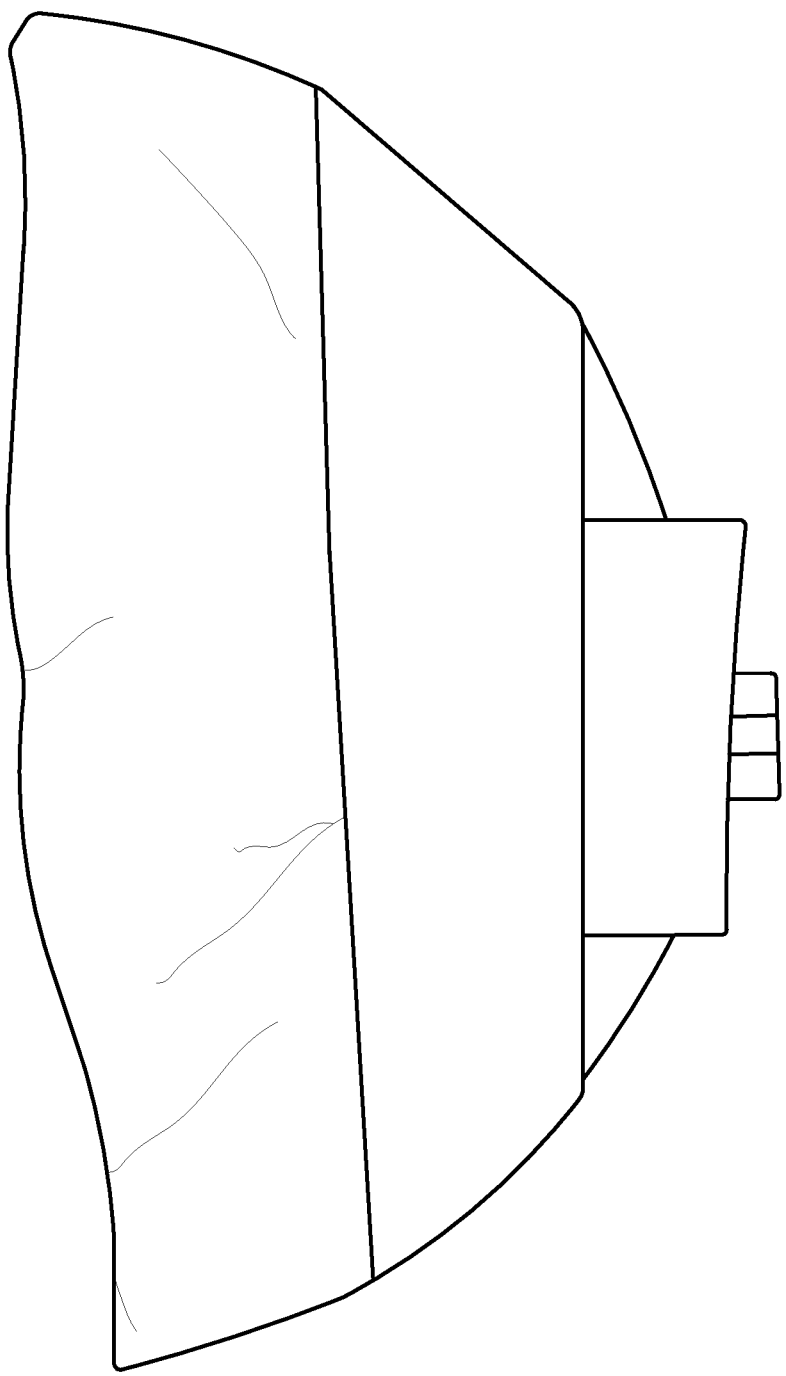
FIG. 26 is a drawing of the embodiment of FIG. 24.
Figure 27:
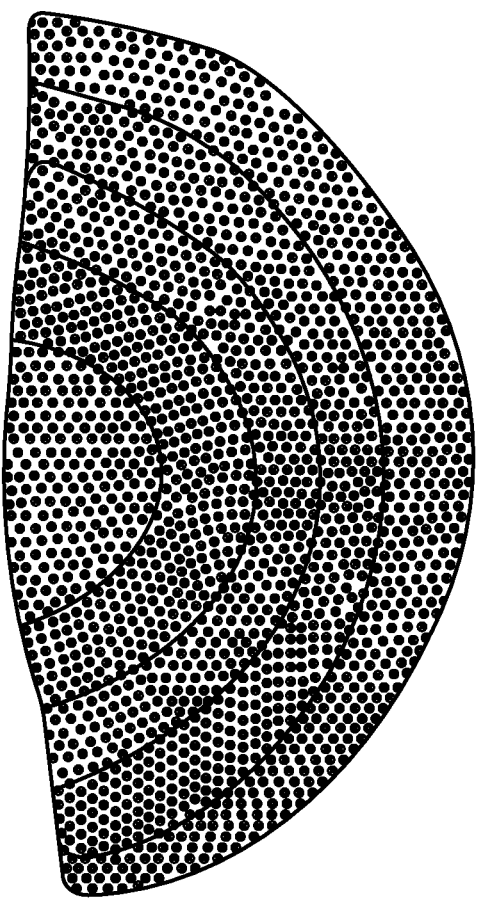
FIG. 27 is a drawing of the embodiment of FIG. 24.
Figure 28:
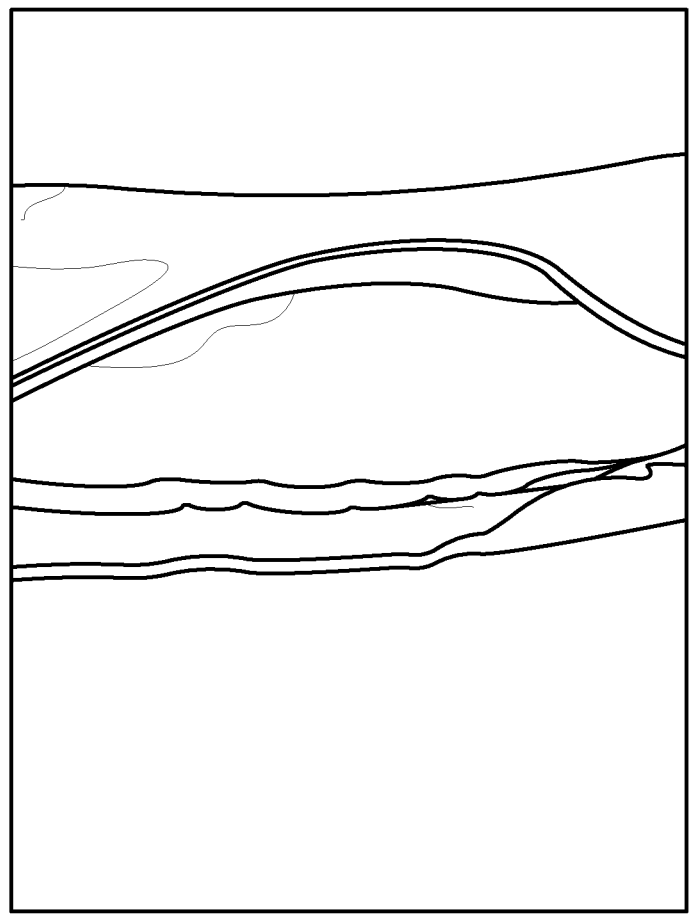
FIG. 28 is a drawing of the embodiment of FIG. 24.

As shown in FIG. 16, in some embodiments, the cover need not be made to custom fit the headlight but may simply cover the headlight via an existing design or shape. Examples of a design can be a flower, a happy face, a sun, a moon, a Halloween pumpkin, and a bowling ball. Examples of a shape can include a fish cat, face of a cat, an eye winking, a shield, etc. The cover may have front and back components and may have magnets attached at its ends that correspond to magnets attached to the headlights, so that the cover may easily adhere to the headlights. In some embodiments, the cover may also have a flap with an enlarged section filled with a material such as sand or hard plastic.

As shown in FIGS. 17-23, another embodiment of a headlight oxidation protector may include a front component, backing component, a flap, and an additional tab. In some embodiments, the tab may be generally aligned with the flap and attached to same area where the flap is connected to the front and backing components. The tab may serve as a visual aid and frictional grip for the user to position the protector over the headlight. The tab may be constructed from materials that are weather-proof As shown in FIGS. 24-28, another embodiment of a headlight oxidation protector may include a front component, backing component, a flap, and an additional tab. In some embodiments, the tab may be generally aligned with the flap and attached to same area where the flap is connected to the front and backing components. The tab may serve as a visual aid and frictional grip for the user to position the protector over the headlight. The tab may be constructed from materials that are weather-proof In the foregoing specification, the protector has been described with reference to specific embodiments. However, it will be appreciated that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprise," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The above detailed Description sets forth rather broadly the more important features of the present invention in order that its contributions to the art may be better appreciated.

As such, those skilled in the art will appreciate that the conception, upon which disclosure is based, may readily be utilized as a basis for designing other structures, methods, and systems for carrying out the several purposes of the present invention. It is important, therefore, that this Description be regarded as including such equivalent constructions insofar as they do not depart from the spirit and scope of the present invention.

Although certain example methods, apparatus and articles of manufacture have been described herein, the scope of coverage of this provisional patent application is not limited thereto. On the contrary, this provisional patent application covers all methods, apparatus and articles of manufacture fairly falling within the scope of the invention either literally or under the doctrine of equivalents.

To the extent the above specification describes example components and functions with reference to compliance requirements, standards and/or protocols, it is understood that the teachings of this disclosure are not limited to such compliance requirements, standards and/or protocols. Such compliance requirements, standards and/or protocols are periodically superseded or revised by newer versions. Accordingly, replacement compliance requirements, standards and/or protocols having the same general functions are equivalents which are intended to be included within the scope of this Description.

Therefore, the foregoing is considered as illustrative only of the principles of the present invention. Further, since numerous modifications and changes will readily occur to those skilled in the art, it is not desired to limit the present invention to the exact construction and operation described, and accordingly, all suitable modifications and equivalents may be resorted to, falling within the scope of the present invention. While the above Description describes various embodiments, it will be clear that the present invention may be otherwise easily adapted to fit any configuration as desired or required. Although four embodiments are shown in FIGS. 1-16 and described above, each embodiment may additionally, or alternatively, include one or more components from one or more of the other embodiments.

As various changes could be made in the above embodiments without departing from the scope of the invention, it is intended that all matter contained in the above Description shall be interpreted as illustrative and not in a limiting sense.

I claim:

1. A vehicle protector, comprising
   (a) a first sheet sized to cover a pair of headlights of a vehicle;
   (b) a second sheet sized to be within 80% of the same surface area as said first sheet and arranged in opposing relationship to said first sheet in a face-to-face manner;
   (c) said first sheet and said second sheet joined around their periphery of their surface area forming a pocket therebetween;
   (d) said first sheet being constructed of a heavier material than said second sheet;
   (e) a flap interconnected with said first sheet, said flap having a length, and said flap having a width between 2 inches and 4 inches;
   (f) said flap having sufficient length to fit under the hood of said vehicle when said first sheet is arranged to said cover said pair of headlights;
   (g) said flap defining an interior portion retaining deformable material therein;
   (h) said flap together with said deformable material having a thickness greater than the combination of the thickness of said first sheet and said second sheet.

2. The protector of claim 1 wherein said deformable material includes at least one of beads, pellets, and dowels.

3. The protector of claim 1 wherein said first sheet and said second sheet are joined with stitching around said periphery.

4. The protector of claim 1 wherein said protector includes a plurality of magnets.

* * * * *